Figure 3:
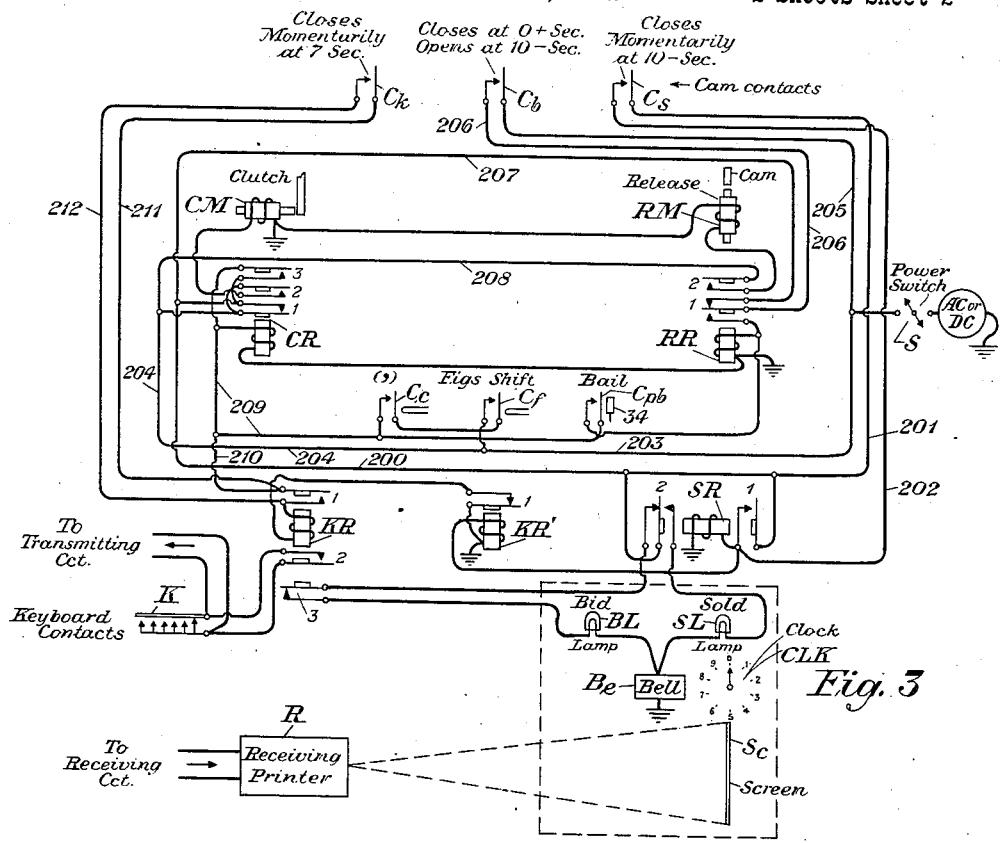

June 8, 1943.  J. A. DUNCAN  2,321,372
TELEGRAPHIC AUCTION SYSTEM
Filed June 4, 1942  2 Sheets-Sheet 1
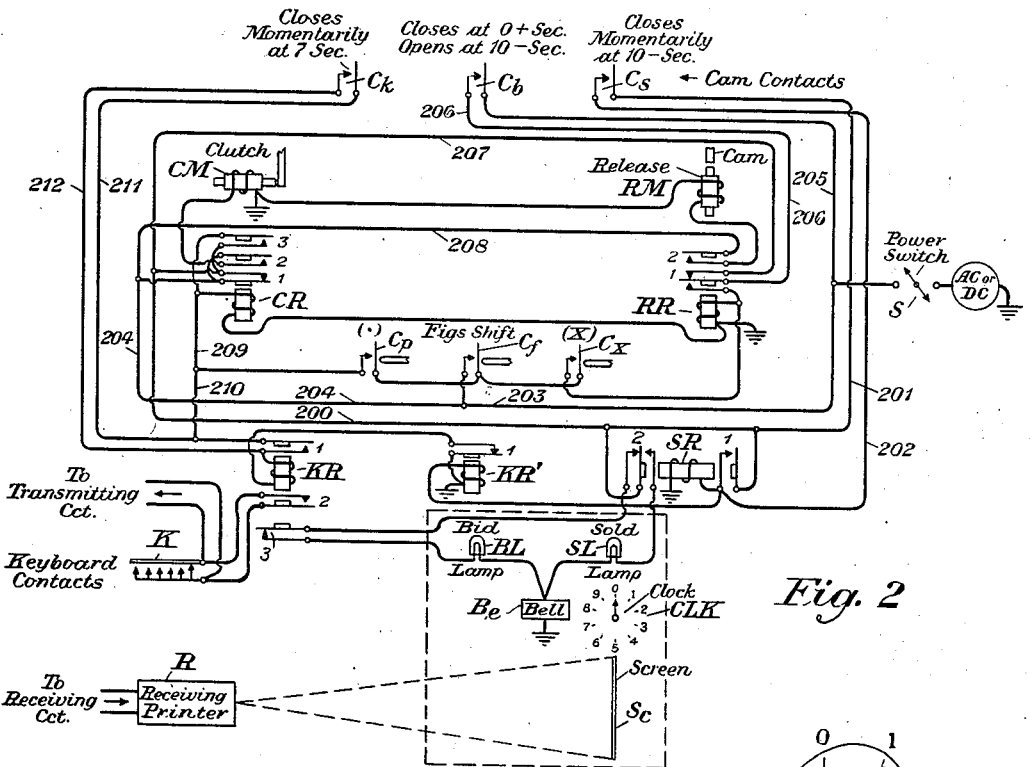
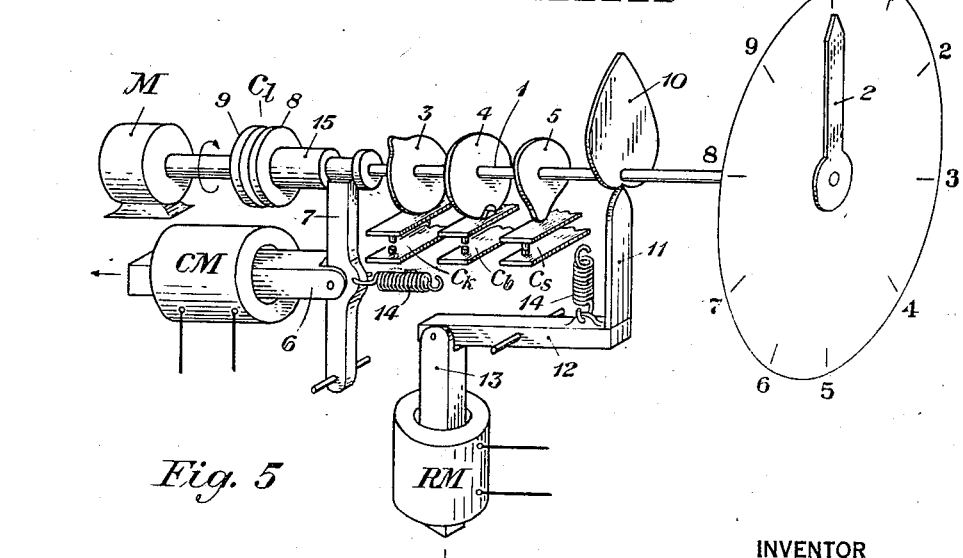
INVENTOR
J. A. Duncan
BY
Claude Le Rose
ATTORNEY June 8, 1943.  J. A. DUNCAN  2,321,372
TELEGRAPHIC AUCTION SYSTEM
Filed June 4, 1942  2 Sheets-Sheet 2

INVENTOR
J. A. Duncan
BY
Claude C. Roca
ATTORNEY

Patented June 8, 1943

2,321,372

UNITED STATES PATENT OFFICE 2,321,372

TELEGRAPHIC AUCTION SYSTEM

James Archibald Duncan, Ridgewood, N. J., assignor to American Telephone and Telegraph Company, a corporation of New York Application June 4, 1942, Serial No. 445,763

16 Claims. (Cl. 177—353)

This invention relates to telegraphic systems to facilitate sales of commodities by auction where the parties participating in the auction are located in widely separated places.

An economic need exists for communication facilities which will enable parties, widely separated geographically, to take part in an auction of certain commodities. For example, the commodities to be auctioned may be farm products stored in warehouses in various parts of the country, or, in some instances, on farms where the crops were grown. The buyers will buy from description of the various groups of commodities to be sold, and the auction may be conducted at some central piont at which it may not be convenient for all of the buyers to be present. It is therefore proposed by the present invention to provide communication facilities to enable such an auction to be held and the goods sold without the buyers being present at the point where the auction is held.

In arrangements previously proposed for this purpose, the various parties taking part in the auction are each provided with teletypewriter facilities, including both transmitting and receiving equipment, and all of the teletypewriter installations are connected together on the same circuit so that information as to bids may be communicated back and forth between the buyers and the auctioneer. Each party participating is provided with facilities for indicating the status and progress of the auction, and for projecting upon a board or a screen information as to the bids and other matters which are typed upon the tape of the teletypewriter machine. The facilities associated with the board or screen involve a dial of a large clock, which is graduated into seconds and is provided with a pointer which rotates during the period that bids can be placed. Certain signal lamps are also provided, one to indicate that bidding may take place, and another to indicate that the commodity or group of commodities upon which bids have been received, has been sold.

It has heretofore been proposed to operate a system of this type in such manner that before the auction takes place, the auctioneer will send from a central point descriptions of the lots to be sold, and such descriptions will be received upon the teletypewriter apparatus of the various bidders. The lots may be identified by numbers or other code arrangements. When all parties have been informed of the commodities to be sold the auctioneer is ready to proceed. The "bid" lamp will be lighted on the boards at each of the stations, and a special signal will be sent which causes the hands or pointers of the clocks on each of the boards to rotate. The bid lamps will remain lighted during this rotation and the pointers of the clocks will continue to move for a definite number of seconds during which any buyer may bid.

If no buyer bids, the pointer of the clock will come to a stop after it has rotated the required number of seconds, and the bid lamp will then be extinguished and the "sold" lamp will be lighted. If, however, during the bidding period a buyer does wish to bid, he will seize the circuit by sending another special signal which will restore the pointers of the clocks at all the stations to their normal positions. The bidder will then, by using the sending element of his teletypewriter, transmit his bid to all of the stations, including the auction room, and at each station it will be projected upon the screen thereat. When the bid has been sent, the special signal which starts the pointers rotating will also be sent, so the clocks will again rotate and indicate the passing of a new period during which other bids may be received. When, after all bids are in, the clock makes a final complete rotation, the sold lamp will be lighted to indicate the lot has been sold. Then the number or other code identifying a new lot is sent out from the auction room, and the bid signal is again transmitted, whereupon the sale of the new lot proceeds as in the case of the first lot.

There are several difficulties in the operation of a system such as has been above described. The principal difficulties are (1) trouble arising due to contention for the circuit by two or more bidders desiring to transmit bids on the teletypewriter network at the same time; and (2) difficulties due to the propagation time of the circuit, which results in the clocks at the various stations not starting at the same time. In consequence, a lot may be marked sold on one or more clocks where the full bidding time has elapsed, whereas at other points the clocks will not have started so soon due to the propagation time of the circuit, and hence the bidding time will appear to be still running.

It is the purpose of the present invention to provide arrangements whereby these difficulties may be overcome, and all parties given an equal opportunity to bid on any commodity put up at auction, without interference between different bidders.

Figure 4:
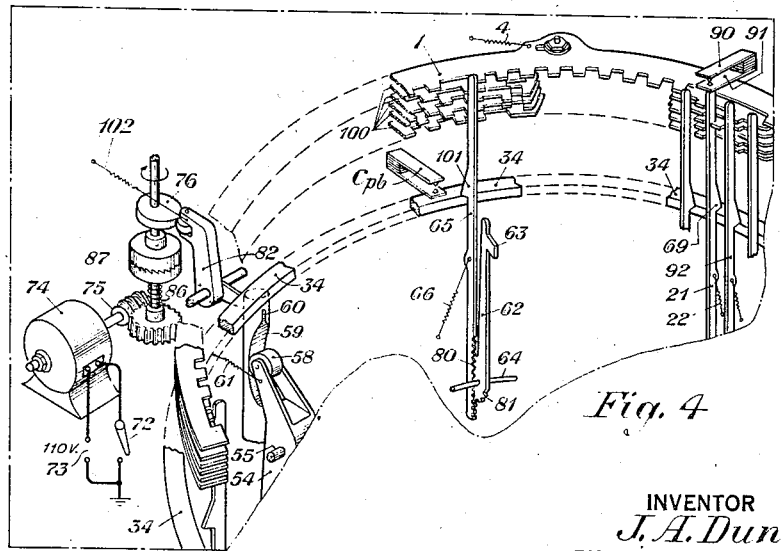

The invention will now be more fully understood in connection with the following detailed description, when read in connection with the accompanying drawings, in which Figure 1 shows a schematic layout of the stations; Fig. 2 is a circuit diagram illustrating the circuit arrangements at a subscriber's station for operating the printing equipment and the apparatus associated with the display board or screen; Fig. 3 is a similar diagram of a modification; Fig. 4 illustrates a part of the teletypewriter receiving equipment by which the board is operated and controlled, and by which messages are recorded to be thrown upon the screen; and Fig. 5 shows in detail a part of the apparatus associated with the clock upon the auction board.

Referring to Fig. 1, three stations, A, B and C are shown connected to a common circuit. Actually, in any practical system a larger number of stations would be provided, but three stations indicate the principles involved.

The difficulty due to difference in propagation time arises from the following considerations. Let us assume that the clock indicating the time for entering the bid rotates over a period of 10 seconds, and that the propagation time from A to B is one second and from B to C is also one second. If, now, station A makes a bid and sends a signal over the network to start the clocks, A's clock will start immediately and the hand will rotate for ten seconds. The clock at station B will start one second later and the clock at station C two seconds later.

Now if the clocks are arranged to indicate the sale of a lot after ten seconds, we will have this situation: Ten seconds after A sends the start signal, if no signal has been received from B or C, A's clock will flash "sold" on the sold lamp. When A's board shows "sold" the clock at station B will be at the nine-second point and the clock at station C will still be at the eight-second point, and the bid lamp will still be operation at both stations. Thus the party at station B or station C might assume that bid might still be made when such is not the case.

In order to be assured of getting in a bid, the party at station C would have to send the stopping signal which stops his clock and goes out over the line to stop the other clocks before his clock indicates that six seconds have elapsed. Otherwise the stopping signal would not arrive at station A before A's clock showed that the lot had been sold. In other words, C would have to send the stopping signal over the line at a time prior to the automatic stopping of his own clock by an amount at least twice as great as the propagation time of the circuit. The propagation times used in the above illustrations are greater than would actually exist but they illustrate the principle involved.

Fig. 2 illustrates an arrangement for overcoming this difficulty and insuring that all parties have an equal chance to bid. This is accomplished by providing the clock arrangement with means whereby the keyboard of the teletypewriter sender may be disabled at a proper time after the clock has started to rotate. Using the illustration referred to immediately above, the clocks at each of the stations are arranged so that when the clock hand reaches the point where the difference between the time actually indicated at that station, and the time when the clock will automatically return to zero and indicate "sold," is equal to or slightly greater than twice the maximum propagation time of the circuit, the keyboard is to be disabled. This may be done by causing the clock to operate a contact which locks out the teletypewriter sending keyboard, and at the same time operate the circuit in such a manner as to extinguish the "bid" lamp but not light the "sold" lamp by means of contact 3 of relay KR. Thus there would be a "dark" or a "no bid" interval of twice the propagation time of the circuit at each station. If no signals are received from the teletypewriter network between this time and the time when the clock would automatically register "sold," then all buyers would have an equal opportunity to bid before the earliest clock reaches the "sold" condition, irrespective of the propagation time of the circuit.

In the specific case discussed above, all clocks would be arranged to lock the keyboards and extinguish the bid lamp at the end of six seconds. Station A would send the bid as before and would send the signal to start all of the clocks. A's clock would start, and one second later B's clock would start. Then two seconds after A's clock starts, the clock at station C would start. After six seconds has elapsed A could send no more bids. After seven seconds B could send no more bids, but this would represent only six seconds during which B has a chance to bid, which is just the same as station A. After eight seconds station C could send no more bids, but station C likewise would have had only six seconds in which to bid.

In the case of stations B and C, their clocks would both show that six seconds elapsed from the time their clocks started until their keyboard became disabled. Thus, if just before the six-second point is indicated on C's clock he wishes to make a bid, he can do so by sending a signal to restore all clocks to zero. This signal would reach stations A and B before the clocks at those stations reached the ten-second point and before the sold lamp is lighted at either of said stations. The clocks at these stations would accordingly be returned to zero and the bid from station C would be recorded. If, however, no bid is sent from stations B or C, all of the clocks will extinguish the "bid" lamp and light the "sold" lamp after they have traveled ten seconds, and no bid can be sent after any clock has operated the "sold" lamp at that station.

The propagation times used in the above illustration are too high but are used for illustrative purposes. It is believed that any nation-wide network could be set up to have propagation time from end to end of not much over one-half second. Accordingly in Fig. 2 the clocks are arranged to rotate for ten seconds before the "sold" lamp is operated, and to permit no bidding after seven seconds have elapsed.

In the circuit arrangement shown in Fig. 2 a teletypewriter keyboard transmitter is shown in part at K, and a receiving printer for recording signals is shown schematically at R. The latter is provided with any of the well-known optical arrangements for projecting the printed symbols on a screen Sc. The receiving printer may assume any well-known form, such for example, as the receiving teletypewriter of the No. 14 type, manufactured by the Teletype Corporation of Chicago, Illinois, which prints its message upon a tape. Associated with the screen Sc is a clock CLK having a pointer arranged to make one complete rotation in ten seconds. A bid lamp BL and a sold lamp SL are also associated with the screen, and a signal Be may be provided if an audible signal is desired.

The clock itself is illustrated in more detail in Fig. 5. It includes a shaft 1 carrying a pointer 2 and cams 3, 4 and 5 for operating the contacts $C_k$, $C_b$, and $C_s$, respectively. The shaft 1 may be caused to rotate by means of a clutch $C_1$ associated with a driving motor M and operated by means of a clutch magnet CM. The clutch magnet CM has a plunger 6 operating a pivoted lever 7, which engages a collar 15 to move the clutch plate 8 into a frictional contact with the clutch plate 9 driven by the motor M. The collar 15 is keyed to rotate with the shaft 1 but may be moved longitudinally along the shaft by the lever 7. When the clutch magnet operates the clutch, the pointer 2 will begin to rotate, and if nothing occurs to stop its rotation it will make one complete rotation and come to rest at the zero point. At this point the clutch $C_1$ will be released by the clutch magnet CM becoming deenergized through the operation of the circuit of Fig. 2, as will be described later.

An additional cam 10 is provided on the shaft so that as the shaft rotates from the zero position the cam 11 will move the element 11 downward during the first half rotation of the shaft, thus rocking the lever 12 about its pivot and lifting the plunger 13 of the release magnet RM against the tension of a spring 14. The spring 14 has just sufficient tension to hold the element 11 against the surface of the cam 10. At the end of one-half rotation of the shaft the element 11 will pass over the relatively sharp point of the cam, which represents the greatest radial distance of the cam from the shaft. The element 11 then rides upon the other surface of the cam, permitting the plunger 13 of the release magnet RM to gradually be pulled downward by the spring 14 until the shaft comes to rest with the element 11 resting between the two cheeks of the cam at the part thereof which is radially nearest to the shaft.

If it is desired to restore the shaft to its zero position before it completes one rotation, this may be done by energizing the release magnet RM, which pulls the plunger 13 downward and causes such a pressure to be exerted by the element 11 upon the cam 10 as to rotate the pointer back to its normal position. If this pressure is applied during the first half of the rotation of the pointer, the element 11 will operate upon one side of the cam to reverse the direction of the shaft and cause it to rotate in a counter-clockwise direction quickly to restore it to its zero position. If, however, the cam has passed the half-way point, the element 11 will be applied to the other face of the cam, and will cause it to rotate very rapidly in a clockwise direction through the balance of its orbit to its normal position. During the operation of the release magnet RM the clutch magnet CM is deenergized and consequently the motor M no longer drives the shaft.

The clutch magnet CM and release magnet RM are controlled by the circuit arrangement shown in Fig. 2. The clock is started in operation by a "figures-period" signal operating the receiving printer R. This signal may be transmitted either by the local transmitting keyboard K, or it may be transmitted from a distant station. In either event, the receiving printer is provided with pull bars which operate the printing type bars as shown in Fig. 4, which will be referred to in more detail later. The pull bars operated in response to the "figures" code and the "period" code, are provided with special contact $C_f$ and $C_p$, respectively.

The "figures" pull bar is for the purpose of shifting from lower case to upper case printing, as is well known in the operation of teletypewriter machines. When both of these contacts are operated the clutch relay CR is energized, and in turn operates the clutch magnet CM. The contact $C_b$, controlled by the cam 4 of the clock mechanism, serves to lock up the clutch relay CR when thus operated. This contact closes as soon as the clock moves off normal, and does not open again until the shaft arrives substantially at its normal position, either by completing a full revolution or by being restored to normal when one of the buyers desired to bid.

When one of the buyers wishes to bid he sends a special combination, for example, the "figures-$x$" code combination. This causes the receiving pull bars corresponding to the platen shift and letter $x$, to respectively operate switches $C_f$ and $C_x$ associated therewith. This causes the release relay RR to operate, which in turn energizes the restoring magnet RM to cause the clock to return to normal position.

A relay SR is provided to control the circuit of the "bid" lamp BL and the "sold" lamp SL. This relay is operated by the contact $C_s$ which is actuated by the cam 5 just before the clock pointer is restored to normal, and serves to extinguish the "bid" lamp and light the "sold" lamp. The relay SR can only operate if the shaft completes one continuous rotation in a normal manner. It is prevented from operation when the shaft is restored to normal by a release signal, because its circuit is controlled over the release relay RR, which is always operated by the release signal and therefore opens the energizing circuit of relay SR.

An additional contact $C_k$, which closes momentarily after the clock has rotated for seven seconds, operates the keyboard locking relay KR. This relay disables the keyboard contacts K and remains locked up until the clock is restored to normal.

Fig. 4 shows those portions of the receiving teletypewriter mechanism (illustrated schematically at R in Fig. 2) which are involved in the operation of the controlling contacts $C_f$, $C_p$ and $C_x$ of Fig. 2. Various pull bars, such as 65, are provided for operating the type bars such as 62. As the pull bar is moved vertically, the rack at 80 causes the type bar 62 to rotate on its shaft 64 to strike the platen and print a character. Any of these pull bars may be arranged to operate contacts. For example, the pull bar 21, when it is shifted vertically will close the contact springs 90 and 91. Only such pull bars as are used in sending special signals for operating the auction board need be provided with such contacts.

The selection of the pull bar to be operated is determined by certain code bars 100. These code bars are arcuate in form and may be shifted longitudinally with respect to each other under the control of the received impulses of the code combination. As is well-known, each teletypewriter character involves five character-determining impulses, which may be either "marking" or "spacing" in various combinations, in accordance with the character to be printed. Each one of these impulses controls individual ones of the code bars 100 to shift any or all of them to their alternate positions, depending upon the combination received.

When so shifted, certain of the notches or indentations in the code bars are brought into alignment at a point corresponding to the selected pull bar. If the notches corresponding to the pull bar 65, for example, are brought into alignment, the spring 66 draws the pull bar rearwardly so that its upper end falls into the aligned notches of the code bars 100. After the five impulses of the code combination have been received, a printing bail 34 is shifted upwardly under the control of a plunger 60. This plunger is lifted by means of a lever 82, which is operated by a cam 76 and spring 102 at a proper point in the cycle of operations of the printer. The cam 76 is controlled through a clutch 87 by means of a motor 74, and operates the lever 82 and the plunger 60 once for each code combination received.

The pull bar 65 is provided with a shoulder as shown at 101. This shoulder is so located that when the pull bar drops into the aligned notches of the code bars 100 it will be in the path of the printing bail 34 as the latter is shifted upward. The particular pull bar selected is, therefore, moved vertically to operate its type bar and associated contact, if any. Other pull bars not so selected will not be operated, as their shoulders will not be brought into the path of the printing bail 34.

It will be understood that only the pull bars operated by the "figures" code combination, the "period" code combination, and the letter "x" combination need be provided with contacts where the circuit of Fig. 2 is used.

The operation of the apparatus above described is as follows:

Before the auction boards are put into service, information will be transmitted over the teletypewriter network to the various stations, informing them of the lots of commodities to be sold and identifying the lots by suitable numbers or other codes. When all this information has been received, instructions will then be sent to put the auction boards into operation. This will be done at each station by operating the power switch S to connect the power source to the circuit. This will cause the bid lamp BL to glow, the circuit of said lamp being completed from the power source over said switch S, over conductors 203 and 204, over the closed contact 1 of relay CR, over conductor 200, over back contact 2 of relay C, and through the lamp BL and bell Be to ground.

The auctioneer will then send the number or other code of the first lot to be auctioned off, and this will be projected by the receiving printer upon the screen Sc. The auctioneer will then start the bidding by sending the code combinations corresponding to "figures-period." The "figures" code combination will shift the pull bar which operates the contact $C_f$ to shift to upper case printing. This particular bar, when shifted, will remain in its upper position with the contact $C_f$ closed, until it is restored to normal or lower case printing by sending the so-called "letters" combination, which operates another pull bar, to shift the platen to its lower case position. The "period" code combination which follows shifts another pull bar to close the contact $C_p$ momentarily. This completes a circuit from the power source over conductor 203, over the closed contact $C_f$, over closed contact $C_p$, and through the winding of the clutch relay CR to ground.

The operation of the relay CR opens its contact 1 to release relay SR (if it has been previously locked up), and closes its contacts 2 and 3. Contact 2 completes an operating circuit for the clutch magnet CM from the power source, over conductors 203 and 204, base of contact 1 of relay CR, over contact 2 of relay CR, through the winding of the clutch magnet CM to ground. The clutch magnet operates to start the clock shaft 1 to rotating in a manner already described. Immediately after the shaft starts rotating, the cam 4 closes contact $C_b$ and provides a locking circuit for the clutch relay CR. This extends from the power source over conductor 205, over contact $C_b$, over conductor 206, over normally closed contact 1 of relay RR, over conductor 207, base of the back spring of contact 1 of relay CR, closed contact 3 of relay CR, and through the winding of said relay to ground. The relay CR and clutch magnet CM will remain operated until said locking circuit is opened at the end of one complete rotation of the clock by the opening of the contact $C_b$, or until said locking circuit is opened by the operation of the release relay RR, as will be described later.

The opening of the normally closed contact 1 of clutch relay CR momentarily opens the circuit of the bid lamp BL, which was lighted when the power was turned on, and continued to glow during the transmission of the number of the lot to be auctioned and during the other operations just described. The circuit of said lamp is immediately closed, however, over the circuit $C_b$ by a circuit from the power source, over conductor 205, over contact $C_b$, over conductor 206, over the normally closed contacts 1 of relay RR, over conductors 207 and 200, over back contact 2 of relay C, and through the bid lamp BL to ground.

As soon as the code combinations "figures-period" have been transmitted as above described, similar operations take place at the other stations of the system. When these code combinations are received at the various stations the clocks start rotating, but they may be out of synchronism by the amount of the propagation time required to transmit a signal from the station from which the signal originated, to any particular station where it is being received.

The clocks are now all rotating, and assuming that no bids are received, the clock at the particular station illustrated continued rotating in a clockwise direction until, at the end of seven seconds after it was set in operation, the contact $C_k$ closes momentarily. This completes a circuit for the keyboard locking relay KR from the power source, over conductor 205, closed contact $C_b$, over conductor 206, over contact 1 of relay RR, over conductor 207, over closed contact 3 of relay CR, over conductors 210 and 211, thence over closed contact $C_k$, over conductor 212, through the winding of relay KR, and over the normally closed contact 1 of relay KR' to ground.

Relay KR is now operated, and at its upper contact 1 closes a locking circuit from the power source over the circuit previously described through the closed contact $C_b$ and contact 1 of relay RR, over conductor 207, over closed contact 3 of relay CR, over conductor 210, closed locking contact 1 of relay KR, and through the winding of said relay and over the normally closed contact 1 of relay KR' to ground. Relay KR will now remain locked up until the clock either rotates to normal position or is restored to normal by the release relay RR, as will be described later. The now closed contact 2 of relay KR short-circuits the contacts of the keyboard K and contact 3 opens the circuit of the bid lamp BL, and the buyer at this particular auction board can no longer transmit a bid.

If, as already assumed, no bids are received, the clock continues rotating in a clockwise direction until it returns to its normal position. Just before it returns to normal the locking contact $C_b$ is opened, and this opens the locking circuit previously traced for the relay CR, which is restored to normal. The opening of contact $C_b$ also opens the locking circuit of the keyboard locking relay KR, which locking circuit is also opened at contact 3 of the relay CR when it is released. This opens the short circuit closed about the keyboard K by contact 2 at relay KR, so the keyboard K can be used.

Just before the clock was restored to its normal or zero position, the contact $C_s$, controlled by the cam 5, is momentarily closed and completes a circuit for the relay SR as follows: From the power source, over conductors 203 and 204 to the base of contact 1, to the base of the contact 2 of relay CR, and (if the latter is deenergized), over the closed contact 1 of relay CR, over conductors 200 and 201, over momentarily closed contact $C_s$, over conductor 202, and through the winding of the relay SR to ground. If the contact $C_s$ is timed so that it is closed before the relay CR is released, the circuit for the relay SR will extend from the power source over conductor 205, over contact $C_b$ (which would still be closed if relay CR is still energized), over conductor 206, over contact 1 of relay RR, over conductors 207, 200 and 201, and thence over contact $C_s$ the circuit previously traced through the winding of the relay SR. Preferably the contact $C_s$ should be timed to close momentarily just after the relay CR is released.

In any event, when the relay SR is operated it closes a locking circuit at its contact 1 from the power source over conductors 203 and 204, over the now closed contact 1 of relay CR to conductor 200 or over the circuit traced through contact $C_b$ and contact 1 of relay RR to said conductor 200, and thence over contact 1 of relay SR, and through the winding of said relay to ground. It will be noticed that ultimately the locking circuit of the relay SR passes over the closed contact of the relay CR, and consequently the relay SR will remain energized until the relay CR is again operated in response to a "bid" signal. Relay SR, when thus operated and locked up, at its No. 2 contact opens the circuit previously traced for the bid lamp BL, and closes a circuit for the "sold" lamp SL which is now lighted and remains so lighted until in response to a "bid" signal the relay CR is again actuated to unlock the relay SR and again close the circuit of the "bid" lamp.

The operations just described take place in case no bid is received and the clock is permitted to rotate through one complete cycle. If, while the clock is rotating and before contact $C_k$ is closed to disable the keyboard K a buyer desires to make a bid, he will send the code combination corresponding to the letter $x$. This will operate a pull bar to momentarily close contact $C_x$. It will be recalled that before this occurred, the bid signal "figures-period," was sent to start the clock rotating. The contact $C_f$, operated by the "figures" pull bar during this operation will remain closed until an "un-shift" or "letters" combination is received. Since no code combinations are sent while the clock is turning until such time as a buyer desires to make a bid, the "figures" pull bar will remain operated. Consequently, when the letter $x$ combination is transmitted, the contact $C_f$ still remains closed, and a circuit is completed for the release relay RR from the power source to conductor 203, thence over closed contacts $C_f$ and $C_x$ and through the winding of relay RR to ground.

This causes the release relay RR to be operated, and at its contact 2 it completes a circuit for the release magnet RM from the power source, over conductors 203, 204 and 208, and thence over contact 2 of relay RR and through the winding of release magnet RM to ground. At its number 1 contact relay RR opens the locking circuit previously traced for the relay CR over the contact $C_b$, so that relay CR is restored to normal. To insure against the possibility that the short impulse through the relay RR during the momentary closing of the contact $C_x$ might not hold the relay RR operated long enough to enable the release magnet RM to fully restore the clock to normal, arrangements are provided to lock up the relay RR until the clock is so restored. Said locking circuit extends from battery over conductor 205, contact $C_b$, conductor 206 and over the front contact of spring 1 of relay RR and through the winding of said relay to ground. This locking circuit will maintain the relay RR (and hence the release magnet RM) energized until the clock is fully restored to normal, when the contact $C_b$ will open the locking circuit of the relay RR, thus restoring said relay and the release magnet RM to their un-energized condition.

False operation of the "sold" relay SR is prevented during the momentary closing of the contact $C_s$ while the clock is being restored to normal by the release magnet RM. This is accomplished by having the energizing circuit for the relay SR passed over the back contact of the release relay RR, which is locked up over contact $C_b$. Relay RR therefore remains operated until the clock shaft has reached substantially its zero position, and holds open the circuit of relay SR for the same period of time. To insure against a momentary impulse being sent through the relay SR by the release of relay RR before contact $C_s$ is opened, relay RR may be made slightly slow to release, thus holding the circuit of the relay SR open for a moment after the shaft has come to rest.

The circuit is now ready to receive the bid of the buyer who operated the $C_x$ contact and restored the clocks to normal. The buyer will proceed to type his bid, which might be, for example "C2.14 — — — — — —," in which the letter C is a letter identifying the bidder, and the figures, of course, represent his bid. The dashes are space signals, sent to advance the tape in the teletypewriter to a point where it reaches the optical system so that the bid may be thrown on the screen. The period, used as the decimal mark, may also serve to start the clock rotating again for further bids. This will be evident from the fact that the numbers pull bar will already have been operated to send the digit 2, and when the period code is sent, the switches $C_p$ and $C_f$ will be operated to energize the clutch relay CR and start the clock rotating in the manner previously described.

It will take perhaps two or three seconds after the period code has been transmitted before the bid will appear on the screen as that much time is required to transmit the digits representing the cents in the bid, followed by the dashes. This, of course, means that the clock will have been rotating this length of time before any buyer will have any opportunity to bid again and is, to some extent, a disadvantage. This might be overcome, for example, by using the code combinations "figures-comma" instead of "figures-period" to set the clocks into operation, as is disclosed in Fig. 3, to be described later. In this instance, instead of the last dash to advance the tape to the proper point in the optical system, a comma may be sent which would start the clocks rotating. It will be understood that in such event a comma could not be used in the messages which are transmitted during the bid. Indeed, there would be no occasion to use a comma in such messages for they would consist entirely of identifying letters and numbers.

It will be apparent, of course, that when the relay RR is operated to restore the clock to normal as above described, with the consequent release of the clutch relay CR, the release of the latter relay will not in any way affect the bid lamp BL. Said lamp will continue to glow over its circuit from the power source, over conductors 203 and 204, over the back contact of spring member 1 of relay CR, and thence over the conductor 200 and over back contact member 2 of relay SR to ground through the bid lamp BL.

The arrangement shown in Fig. 2 takes care of the difficulties arising due to the propagation time of the circuits. It does not take care of the difficulties arising from several bidders contending for the circuit at the same time. Moreover, it has the disadvantage that the bidding time allowed to any buyer is cut short during the last few seconds of the rotation of the clock to take care of the propagation time, and is further cut off at the beginning of the rotation of the clock by sending a period signal before the entire bid is received and before the spacing signals are transmitted. Both of these difficulties, as well as that arising from the propagation time of the circuit, may be eliminated by using the circuit shown in Fig. 3.

Here the essential differences are that the bid signal instead of being "figures-period" may be "figures-comma" or some other code combination which is not used for ordinary communication purposes, while the operation of the relay RR may be made to depend upon the closing of a contact by some element of the printer which operates in response to any signal, regardless of the character of the signal. Thus, if two buyers should at the same time attempt to seize the circuit by transmitting some particular code combination previously agreed upon—for example, the letter "x"—the code combination actually transmitted might correspond to some other letter or figure, due to the fact that the two letter "x" codes are sent to the circuit slightly out of phase with each other. By using an element of the printer which is operated in response to any signal to operate the release contact, a code of some kind will be received at all of the stations if two or more buyers send overlapping codes, and the relay RR will accordingly be operated.

An element which would satisfy these requirements is the bail 34 for operating the pull bars as shown in Fig. 4. By providing contacts such as $C_{pb}$, shown in Fig. 4, to be operated by the bail 34, the desired results above referred to may be obtained. It will, of course, be necessary to arrange the circuit to be closed by the contact $C_{pb}$ so that it can be completed only when the clutch relay CR is operated and the clock shaft is off normal, as otherwise the contact $C_{pb}$ will operate the release relay RR every time a code combination is sent either to identify a lot to be auctioned or to transmit a buyer's bid.

The details of this feature of the circuit will be evident from a description of the operation of the circuit of Fig. 3, which is as follows:

The letters and figures to identify the lot to be sold can be sent before the bidding operation without operating the clutch relay CR, as the "figures-comma" combination used for operating this relay will not occur in the transmission of such information. The bail 34 will not under these conditions operate the release relay RR, for its circuit must be completed from the power source over conductor 205, contact $C_b$, conductor 206, back contact of contact member 1 of relay RR, conductor 207, front contact of spring 3 of relay CR, conductor 209, contact $C_{pb}$, and through the winding of relay RR to ground. This circuit would, of course, be open at contact 3 of relay CR at all times except when the relay CR is energized to start the clock into rotation. While the clock is rotating and the relay CR is accordingly energized, no signals are transmitted until some buyer wishes to place a bid on the circuit, and hence the contact $C_{pb}$ will not be operated by the bail 34 until an attempt to bid occurs.

When the information with regard to the lot to be auctioned has been transmitted, the "figures-comma" codes may be sent. The contact $C_f$ will now be closed in response to the "figures" code, and the contact $C_c$ in response to the "comma" code immediately following. Consequently the relay CR is operated from the power source, over conductor 203, contacts $C_f$ and $C_c$, over conductor 209, and through the winding of relay CR to ground. Relay CR operates and locks itself up and energizes the clutch magnet CM over circuits similar to those traced in connection with the circuit of Fig. 2. Contact 1 is opened to break the locking circuit of the relay SR in case the latter has previously been operated and locked up to light the "sold" lamp. The release of relay SR, of course, opens the circuit of the "sold" lamp SL and closes the circuit of the "bid" lamp BL previously traced in connection with Fig. 2. Contact 2 of relay CR closes the circuit of the clutch magnet CM and the clock will now rotate until, after seven seconds have elapsed, the contact $C_k$ closes to operate the relay KR over a circuit similar to that described in connection with Fig. 2, thus disabling the keyboard K.

If no bids are sent and the clock is permitted to complete its rotation, the contact $C_b$ will be opened just before the clock comes to rest, and the locking circuit of the relay CR will be opened, restoring the relay CR to normal. At the same time the contact $C_s$ will be closed momentarily to operate the relay SR and lock said relay up over circuits similar to those previously traced in connection with Fig. 2. Relay SR when operated, as its contact member 2 opens the circuit of the bid lamp BL and closes the circuit of the sold lamp SL, which now glows.

If, while the clock is rotating and before the contact $C_k$ is closed the buyer wishes to bid, all he needs do is start sending his bid, which, as before, might be "C2.14" followed by several dashes to space out the tape to bring the bid before the optical system of the receiver R. The printing bail 34 will be operated and close the contact $C_{pb}$. At this time, since relay CR is energized and the contact $C_b$ is closed, a circuit will be completed for the release relay RR as follows: From the power source, over conductor 205, over contact C$_b$, conductor 206, closed contact member 1 of relay RR, conductor 207, closed contact 3 of relay CR, conductor 209, over closed contact C$_{pb}$ and through the winding of relay RR to ground. Relay RR will thus be energized. Under conditions above described, it will be evident that the printing bail 34 can only be effective to operate the relay RR when two requirements are satisfied—(1) the clutch relay CR must be energized and (2) the contact C$_b$ must be closed. These two conditions will only occur during the time that the clock is rotating with no signals being sent over the circuit and while awaiting bids.

Relay RR upon being operated is locked up over a circuit from the power source over conductor 205, closed contact C$_b$, conductor 201, over the front contact of spring member 1 of relay RR, and through the winding of said relay to ground. Relay RR will therefore remain locked up until the clock is restored to normal, when the contact C$_b$ will be opened. At its contact member 2, relay RR completes a circuit for the release magnet RM similar to that described in connection with Fig. 2, and the release magnet operates to restore the clock pointer to normal. The shifting of contact 1 of relay RR to its back contact opens the locking circuit of the clutch relay CR and releases said relay, and consequently the clutch magnet CM is deenergized. When the relay CR is released, the locking circuit of the keyboard locking relay KR is released at contact 3 of relay CR and the keyboard is again in condition to be used. As soon as the clock pointer is restored to normal, the release relay RR is deenergized by the opening of its locking circuit at the contact C$_b$. The equipment is now in condition to receive the bid which is transmitted by operating the keyboard contacts K. The bid, of course, is followed by the necessary spacing codes, and these in turn are followed by the code combination for the comma, which again starts the clock into operation, awaiting the receipt of higher bids. The bid lamp BL, of course, continues to glow during this period.

While the invention has been disclosed in certain specific arrangements which are deemed desirable, it will be obvious that the general principles herein disclosed may be embodied in many other organizations widely different from those illustrated, without departing from the spirit of the invention as defined in the appended claims.

What is claimed is:

1. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp and cause said sold lamp to glow, and means effective to disable said teletypewriter transmitter a predetermined interval before said timing arrangement has operated for its predetermined period of time.

2. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp, cause said sold lamp to glow, and to restore said timing arrangement to normal, and means effective to disable said teletypewriter transmitter a predetermined interval before said timing arrangement has operated for its predetermined period of time.

3. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp and cause said sold lamp to glow, and means effective to disable said teletypewriter transmitter a predetermined interval before said timing arrangement has operated for its predetermined period of time, said predetermined interval being at least twice the propagation time of said circuit.

4. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp, cause said sold lamp to glow, and to restore said timing arrangement to normal, and means effective to disable said teletypewriter transmitter a predetermined interval before said timing arrangement has operated for its predetermined period of time, said predetermined interval being at least twice the propagation time of said circuit.

5. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp and cause said sold lamp to glow, means effective to disable said teletypewriter transmitter a predetermined interval before said timing arrangement has operated for its predetermined period of time, and means associated with each teletypewriter to enable a buyer at any station to place a bid by stopping said timing arrangement and restoring it to normal before it has operated for its predetermined time, said last mentioned means being responsive to a code sent from any station before the transmitter thereat is disabled.

6. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp, cause said sold lamp to glow, and to restore said timing arrangement to normal, means effective to disable said teletypewriter transmitter a predetermined interval before said timing arrangement has operated for its predetermined period of time, and means associated with each teletypewriter to enable a buyer at any station to place a bid by stopping said timing arrangement and restoring it to normal before it has operated for its predetermined time, said last mentioned means being responsive to a code sent from any station before the transmitter thereat is disabled.

7. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp and cause said sold lamp to glow, means effective to disable said teletypewriter transmitter a predetermined interval before said timing arrangement has operated for its predetermined period of time, said predetermined interval being at least twice the propagation of said circuit, and means associated with each teletypewriter to enable a buyer at any station to place a bid by stopping said timing arrangement and restore it to normal before it has operated for its predetermined time, said last mentioned means being responsive to a code sent from any station before the transmitted thereat is disabled.

8. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to distinguish said bid lamp, cause said sold lamp to glow, and to restore said timing arrangement to normal, means effective to disable said teletypewriter transmitter a predetermined interval before said timing arrangement has operated for its predetermined period of time, said predetermined interval being at least twice the propagation time of said circuit, and means associated with each teletypewriter to enable a buyer at any station to place a bid by stopping said timing arrangement and restoring it to normal before it has operated for its predetermined time, said last mentioned means being responsive to a code sent from any station before the transmitter thereat is disabled.

9. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp and cause said sold lamp to glow, means effective to disable said teletypewriter transmitter a predetermined interval before said timing arrangement has operated for its predetermined period of time, and means associated with each teletypewriter to enable a buyer at any station to place a bid by stopping said timing arrangement and restoring it to normal before it has operated for its predetermined time, said last mentioned means being responsive to any code sent from any station after said timing arrengement has started to operate and before the transmitter thereat is disabled, but being unresponsive to any code sent before said timing arrangement has started to operate.

10. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp, cause said sold lamp to glow, and to restore said timing arrangement to normal, means effective to disable said teletypewriter transmitter a predetermined interval before said timing arrangement has operated for its predetermined period of time, and means associated with each teletypewriter to enable a buyer at any station to place a bid by stopping said timing arrangement and restoring it to normal before it has operated for its predetermined time, said last mentioned means being responsive to any code sent from any station after said timing arrangement has started to operate and before the transmitter thereat is disabled, but being unresponsive to any code sent before said timing arrangement has started to operate.

11. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp and cause said sold lamp to glow, means effective to disable said teletypewriter transmitter a predetermined interval before said timing arrangement has operated for its predetermined period of time, said predetermined interval being at least twice the propagation time of said circuit, and means associated with each teletypewriter to enable a buyer at any station to place a bid by stopping said timing arrangement and restoring it to normal before it has operated for its predetermined time, said last mentioned means being responsive to any code sent from any station after said timing arrangement has started to operate and before the transmitter thereat is disabled, but being unresponsive to any code sent before said timing arrangement has started to operate.

12. In an auction communication system, a plurality of stations each having a teletypewriter including a transmitter thereat, a circuit interconnecting said stations over which teletype communications may be carried on by means of said teletypewriters, a timing arrangement at each station, means associated with each teletypewriter responsive to a special code to set the timing arrangement in operation, a "bid" lamp arranged to glow while said timing arrangement is operating, a "sold" lamp at each station, means effective after said timing arrangement has operated for a predetermined period of time to extinguish said bid lamp, cause said sold lamp to glow, and to restore said timing arrangement to normal, means effective to disable said teletypewriter transmitter a predetermined interval before said timing arrangement has operated for its predetermined period of time, said predetermined interval being at least twice the propagation time of said circuit, and means associated with each teletypewriter to enable a buyer at any station to place a bid by stopping said timing arrangement and restoring it to normal before it has operated for its predetermined time, said last mentioned means being responsive to any code sent from any station after said timing arrangement has started to operate and before the transmitter thereat is disabled, but being unresponsive to any code sent before said timing arrangement has started to operate.

13. In an auction communication system, a plurality of stations each having a teletypewriter including a transmitter thereat, a circuit interconnecting said stations over which teletype communications may be carried on by means of said teletypewriters, a timing arrangement including a clock having a dial and a pointer, means associated with each teletypewriter responsive to a special code to start said pointer to moving over said dial, a "bid" lamp arranged to glow while said pointer is so moving, a "sold" lamp at each station, means effective after said pointer has moved over said dial for a predetermined period of time to extinguish said bid lamp and cause said sold lamp to glow, means effective to disable said teletypewriter transmitter when said pointer has moved for a predetermined interval which is less than said predetermined period of time, and means associated with each teletypewriter to enable a buyer at any station to place a bid by stopping said pointer and restoring it to normal before it has operated for its predetermined time, said last mentioned means being responsive to a code sent from any station before the transmitter hereat is disabled.

14. In an auction communication system, a plurality of stations each having a teletypewriter including a transmitter thereat, a circuit interconnecting said stations over which teletype communications may be carried on by means of said teletypewriters, a timing arrangement including a clock having a dial and a pointer, means associated with each teletypewriter responsive to a special code to start said pointer to moving over said dial, a "bid" lamp arranged to glow while said pointer is so moving, a "sold" lamp at each station, means effective after said pointer has moved over said dial for a predetermined period of time to extinguish said bid lamp, cause said sold lamp to glow, and to restore said pointer to normal, means effective to disable said teletypewriter transmitter when said pointer has moved for a predetermined interval which is less than said predetermined period of time, and means associated with each teletypewriter to enable a buyer at any station to place a bid by stopping said pointer and restoring it to normal before it has operated for its predetermined time, said last mentioned means being responsive to a code sent from any station before the transmitter thereat is disabled.

15. In an auction communication system, a plurality of stations each having a teletypewriter including a transmitter thereat, a circuit interconnecting said stations over which teletype communications may be carried on by means of said teletypewriters, a timing arrangement including a clock having a dial and a pointer, means associated with each teletypewriter responsive to a special code to start said pointer to moving over said dial, a "bid" lamp arranged to glow while said pointer is so moving, a "sold" lamp at each station, means effective after said pointer has moved over said dial for a predetermined period of time to extinguish said bid lamp and cause said sold lamp to glow, means effective to disable said teletypewriter transmitter when said pointer has moved for a predetermined interval which is less than said predetermined period of time by at least twice the propagation time of said circuit, and means associated with each teletypewriter to enable a buyer at any station to place a bid by stopping said pointer and restoring it to normal before it has operated for its predetermined time, said last mentioned being responsive to a code sent from any station before the transmitter thereat is disabled.

16. In an auction communication system, a plurality of stations each having a teletypewriter including a transmitter thereat, a circuit interconnecting said stations over which teletype communications may be carried on by means of teletypewriters, a timing arrangement including a clock having a dial and a pointer, means associated with each teletypewriter responsive to a special code to start said pointer to moving over said dial, a "bid" lamp arranged to glow while said pointer is so moving, a "sold" lamp at each station, means effective after said pointer has moved over said dial for a predetermined period of time to extinguish said bid lamp, cause said sold lamp to glow and to restore said pointer to normal, means effective to disable said teletypewriter transmitter when said pointer has moved for a predetermined interval which is less than said predetermined period of time by at least twice the propagation time of said circuit, and means associated with each teletypewriter to enable a buyer at any station to place a bid by stopping said pointer and restoring it to normal before it has operated for its predetermined time, said last mentioned means being responsive to a code sent from any station before the transmitter thereat is disabled.

JAMES A. DUNCAN.